United States Patent
Wada

(10) Patent No.: US 11,247,636 B2
(45) Date of Patent: Feb. 15, 2022

(54) VEHICLE ELECTRONIC KEY SYSTEM AND IN-VEHICLE DEVICE

(71) Applicant: DENSO CORPORATION, Kariya (JP)

(72) Inventor: Hidenori Wada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/240,458

(22) Filed: Apr. 26, 2021

(65) Prior Publication Data

US 2021/0245706 A1 Aug. 12, 2021

Related U.S. Application Data

(63) Continuation of application No. PCT/JP2019/035480, filed on Sep. 10, 2019.

(30) Foreign Application Priority Data

Nov. 9, 2018 (JP) .............................. JP2018-211294

(51) Int. Cl.
*B60R 25/24* (2013.01)
*B60R 25/102* (2013.01)
*B60R 25/34* (2013.01)

(52) U.S. Cl.
CPC ............ *B60R 25/24* (2013.01); *B60R 25/102* (2013.01); *B60R 25/34* (2013.01); *B60R 2325/10* (2013.01)

(58) Field of Classification Search
CPC ... B60R 2325/10; B60R 25/102; B60R 25/24; B60R 25/31; B60R 25/32; B60R 25/34; E05B 49/00
See application file for complete search history.

(56) References Cited

U.S. PATENT DOCUMENTS

2003/0034915 A1* 2/2003 Sasaki ..................... B60R 25/33
342/357.4
2016/0236652 A1* 8/2016 Miyazawa .............. B60R 25/24

FOREIGN PATENT DOCUMENTS

JP 2014091434 A 5/2014

* cited by examiner

*Primary Examiner* — Omeed Alizada
(74) *Attorney, Agent, or Firm* — Harness, Dickey & Pierce, P.L.C.

(57) ABSTRACT

A vehicle electronic key system acquires a vehicle vibration, which is a vibration generated in a vehicle, at a time of a driver's door of the vehicle being closed after a driver is presumed to get in the vehicle, and a key vibration, which is a vibration generated in an electronic key, at the time of the driver's door being closed after the driver is presumed to get in the vehicle. The system determines whether or not the vehicle vibration and the key vibration at the time of the driver's door being closed match each other, and permits an operation of a predetermined operation target device mounted in the vehicle on the condition that the vehicle vibration and the key vibration match each other.

10 Claims, 8 Drawing Sheets

VEHICLE ELECTRONIC KEY SYSTEM AND IN-VEHICLE DEVICE

CROSS REFERENCE TO RELATED APPLICATIONS

The present application is a continuation application of International Patent Application No. PCT/JP2019/035480 filed on Sep. 10, 2019, which designated the U.S. and claims the benefit of priority from Japanese Patent Application No. 2018-211294 filed on Nov. 9, 2018. The entire disclosures of all of the above applications are incorporated herein by reference.

TECHNICAL FIELD

The present disclosure relates to a vehicle electronic key system and an in-vehicle device that authenticate an electronic key by executing wireless communication between the electronic key and the in-vehicle device.

BACKGROUND

A method is known in which radio waves transmitted by an in-vehicle device are relayed using a repeater to make an electronic key, which is out of reach of the radio waves transmitted by the in-vehicle device, communicate with the in-vehicle device, thereby illegally establishing authentication.

As a countermeasure against the above-mentioned fraudulent method, the presence or absence of a passenger in the vehicle is determined based on whether a door of the vehicle is opened or closed, and whether or not the electronic key detects a vibration when the vehicle door is closed. Then, the determination result is used as one of operation permission conditions for permitting an operation of a device mounted in the vehicle.

SUMMARY

The present disclosure describes a vehicle electronic key system that acquires a vehicle vibration, which is a vibration generated in a vehicle, at a time of a driver's door of the vehicle being closed after a driver is presumed to get in the vehicle, and a key vibration, which is a vibration generated in an electronic key, at the time of the driver's door being closed after the driver is presumed to get in the vehicle. The vehicle electronic key system determines whether or not the vehicle vibration and the key vibration at the time of the driver's door being closed match each other, and permits an operation of a predetermined operation target device mounted in the vehicle on the condition that the vehicle vibration and the key vibration match each other.

DETAILED DESCRIPTION

In a vehicle electronic key system in which, as a countermeasure against an illegal key authentication, the presence or absence of a passenger in a vehicle may be determined based on whether a door of the vehicle is opened or closed, and whether or not an electronic key detects a vibration when the vehicle door is closed. Further, the determination result may be used as one of operation permission conditions for permitting an operation of a device mounted in the vehicle. Also, there is a system which only determines whether or not the electronic key detects vibrations when the vehicle door is closed. However, there are many situations in which fraud is committed, such as when a legitimate user parks the vehicle in a parking lot of a store or the like and leaves from the vehicle with the electronic key carried. In the situation where the legitimate user is moving with the electronic key, the electronic key detects vibrations.

In such a situation, therefore, even if a person who opens and closes the door of the vehicle is a person who commits fraud, the electronic key detects vibration when the door is closed, and there is a fear that the operation permission condition may be satisfied.

According to an aspect of the present disclosure, a vehicle electronic key system includes an electronic key and an in-vehicle device mounted in a vehicle. The electronic key and the in-vehicle device communicate wirelessly with each other. The vehicle electronic key system includes:

a vehicle vibration acquisition unit that acquires a vehicle vibration, which is a vibration generated in the vehicle, at a time of a driver's door of the vehicle being closed after a driver is presumed to get in the vehicle;

a key vibration acquisition unit that acquires a key vibration, which is a vibration generated in the electronic key, at the time of the driver's door being closed after the driver is presumed to get in the vehicle;

a match determination unit that determines whether or not the vehicle vibration and the key vibration at the time of the driver's door being closed match each other; and an operation permission unit that permits an operation of a predetermined operation target device mounted in the vehicle on condition that the match determination unit determines that the vehicle vibration and the key vibration at the time of the driver's door being closed match each other.

Even if a legitimate user is moving with the electronic key carried and the electronic key vibrates when the driver's door of the vehicle is closed, it is unlikely that the key vibration matches the vehicle vibration at the time of the driver's door being closed by an unauthorized person. Therefore, in the vehicle electronic key system, it is less likely that the operation of the operation target device will be permitted by an act of the unauthorized person.

Schematic Configuration of Vehicle Electronic Key System EKS

Figure 1:
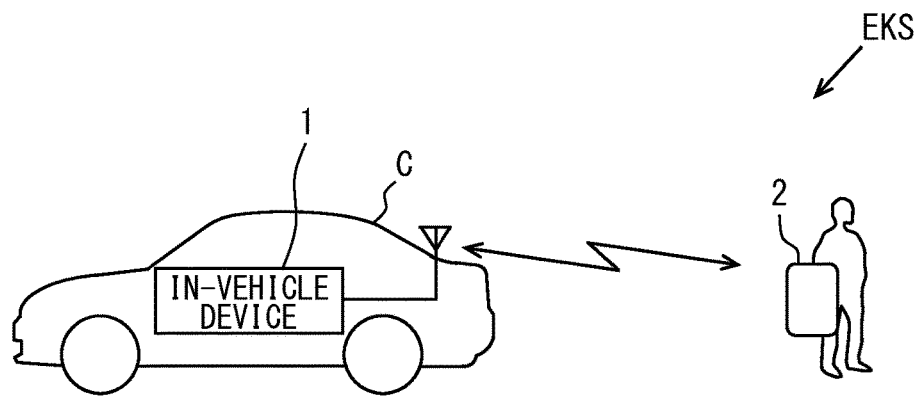
FIG. 1 is a diagram showing a schematic configuration of an example of a vehicle electronic key system EKS.

FIG. 1 shows an example of a schematic configuration of a vehicle electronic key system EKS. The vehicle electronic key system EKS includes an in-vehicle device 1 mounted in a vehicle C and an electronic key 2 to be carried by a user.

The vehicle electronic key system EKS is a system that causes signal transmission and reception using short-range wireless communication between the in-vehicle device 1 and the electronic key 2 to execute a code collation, and permits an operation of an operation target device when the code collation is approved. The operation target devices are, for example, a door lock motor of a vehicle door locking mechanism and an engine. Some of the operation target devices is given, as a condition for permitting the operation, a condition that a vibration generated in the vehicle C when a driver's door of the vehicle C is closed matches a vibration generated in the electronic key 2 when the driver's door of the vehicle C is closed.

Configuration of In-Vehicle Device 1

Figure 2:
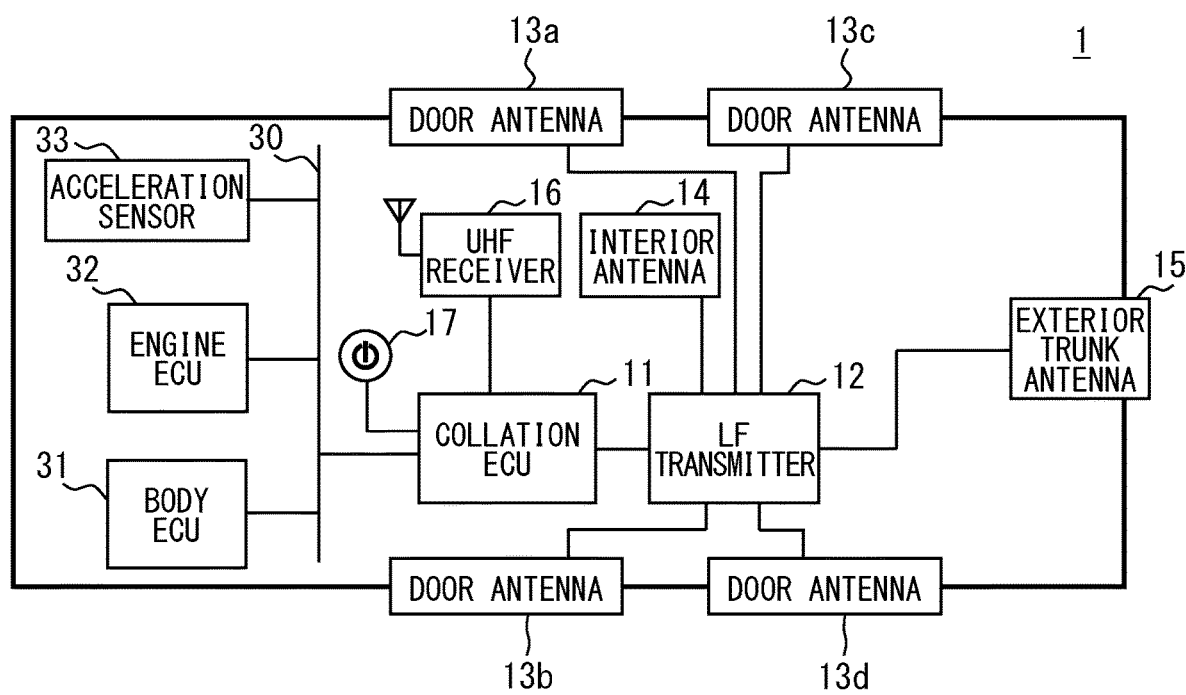
FIG. 2 is a block diagram showing a schematic configuration of an in-vehicle device.

Configurations of the in-vehicle device 1 are described with reference to FIG. 2. The in-vehicle device 1 includes a collation ECU 11, an LF transmitter 12, door antennas 13a, 13b, 13c, 13d, an interior antenna 14, an exterior trunk antenna 15, a UHF receiver 16, and a power switch 17.

The LF transmitter 12, which is a wireless transmitter, transmits a request signal in the LF band radio wave to the electronic key 2 through at least one of the door antennas 13a-13d, the interior antenna 14, and the exterior trunk antenna 15. The door antennas 13a-13d are LF antennas. The LF band has a frequency range from 30 kHz to 300 kHz, for example. The request signal is a signal that requests the electronic key 2 to transmit an identification code for the code collation.

The door antenna 13a is provided in the driver's door. The door antenna 13b is provided in a passenger's door. The door antenna 13c is provided in a rear right door. The door antenna 13d is provided in a rear left door. The interior antenna 14 is located inside a vehicle cabin, and the exterior trunk antenna 15 is provided in a trunk room door as one of vehicle doors. The driver's door is a door next to a driver's seat, and the passenger's door is a door next to a passenger's seat. The rear right door is a door on the right side of a rear seat, and the rear left door is a door on the left side of the rear seat.

A wireless communication area of the door antenna 13a is limited to an outside of the vehicle C and near the driver's door. A wireless communication area of the door antenna 13b is limited to the outside of the vehicle C and near the passenger's door. A wireless communication area of the door antenna 13c is limited to the outside of the vehicle C and near the rear right door. A wireless communication area of the door antenna 13d is limited to the outside of the vehicle C and near the rear left door. A wireless communication area of the interior antenna 14 is limited to the vehicle cabin, and a wireless communication area of the exterior trunk antenna 15 is limited to the outside of the vehicle C and near the trunk room door.

The UHF receiver 16 has a UHF antenna and receives signals transmitted from the electronic key 2 in the UHF band radio wave with the UHF antenna. The UHF band has a frequency range from 300 MHz to 3 GHz, for example. The signals transmitted from the electronic key 2 include, for example, a response signal. The response signal is a signal returned from the electronic key 2 in response to the request signal described above.

The power switch 17 is located near a steering wheel in the vehicle cabin so that it can be operated by the driver. The power switch 17 is a switch operated by the driver to switch the power supply state of the vehicle C to an off state, an accessory state, or an on state. The engine operates when the power supply state is in the on state.

The collation ECU 11 can be realized by a configuration with at least one processor. For example, the collation ECU 11 can be realized by a computer provided with a CPU, a ROM, a RAM, an I/O, and bus lines connecting these components, and the like. The ROM stores a program to make a general-purpose computer function as the collation ECU 11. When the CPU executes the program stored in the ROM while using the temporary storage function of the RAM, the collation ECU 11 functions as each of the parts shown in FIG. 3. The execution of these functions means that a method corresponding to the program is executed. The functions provided by the collation ECU 11 will be described later with reference to FIG. 3.

The collation ECU 11 is connected to the in-vehicle LAN 30. A body ECU 31, an engine ECU 32, an acceleration sensor 33, and the like are also connected to the in-vehicle LAN 30. The collation ECU 11 can transmit and receive signals to and from other elements connected to the in-vehicle LAN 30.

The body ECU 31 outputs a drive signal for controlling locking and unlocking of each vehicle door to a door lock motor provided in each vehicle door. The body ECU 31 is also connected to lock and unlock sensors on some or all of outer door handles of the vehicle doors, and detects a user's touch on the lock and unlock sensors. In addition, the body ECU 31 is connected to a curtesy switch provided for each vehicle door to detect opening and closing of each vehicle door.

When acquiring an engine start permission signal from the collation ECU 11, the engine ECU 32 becomes in an engine start standby state, which is a state in which a starter motor and the like can start. In addition, the engine ECU 32 controls the amount of fuel supplied to the engine, an ignition timing and the like. The acceleration sensor 33 has a detection axis set in the vehicle width direction of the vehicle C, and detects vibrations generated in the vehicle width direction of the vehicle C.

Functions Provided by Collation ECU 11

Figure 3:
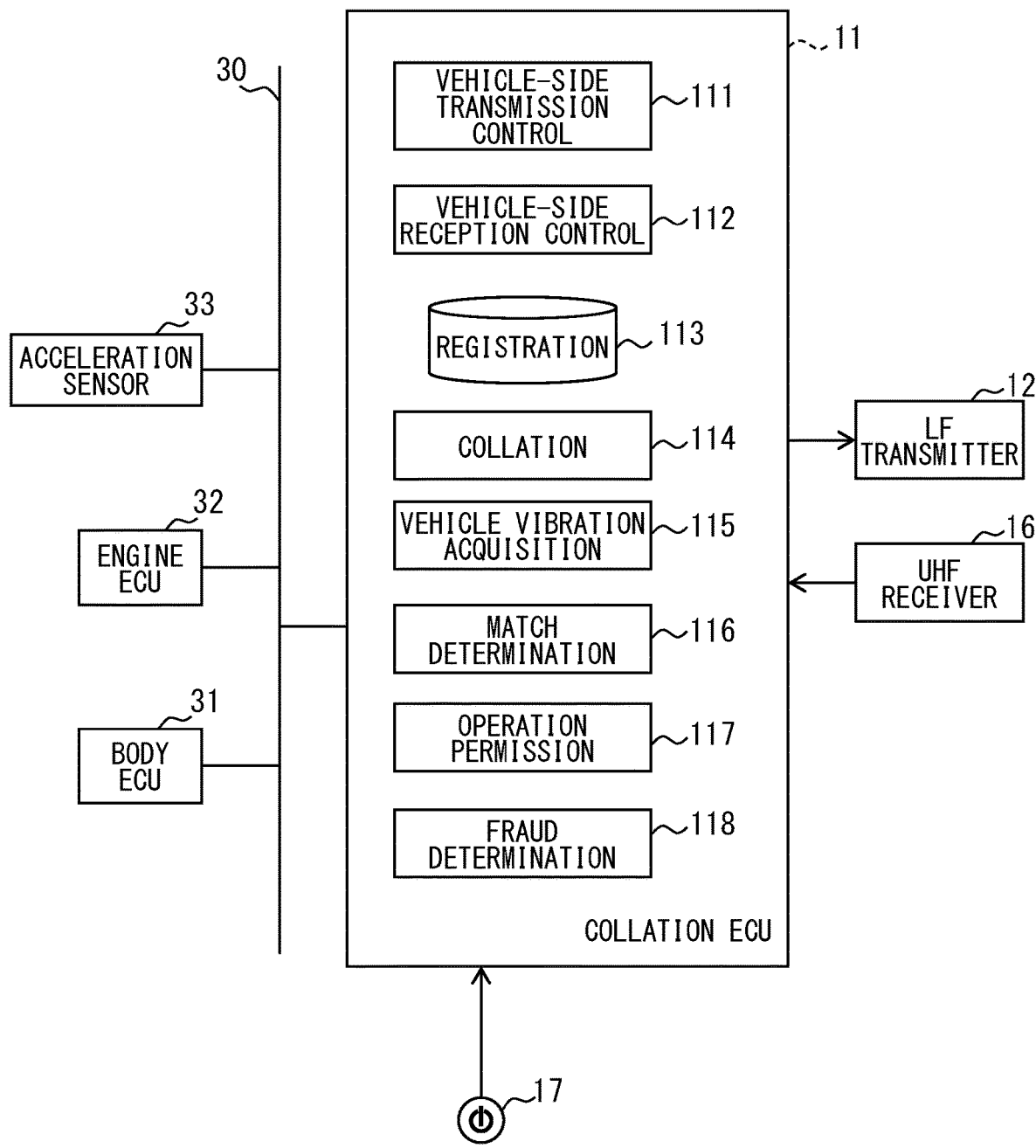
FIG. 3 is a block diagram showing functions provided in a collation ECU.

Next, the functions provided by the collation ECU 11 is described. As shown in FIG. 3, the collation ECU 11 includes a vehicle-side transmission control unit 111, a vehicle-side reception control unit 112, a registration unit 113, a collation unit 114, a vehicle vibration acquisition unit 115, a match determination unit 116, an operation permission unit 117, and a fraud determination unit 118.

The vehicle-side transmission control unit 111 causes the LF transmitter 12 to transmit the request signal through the door antennas 13a-13d and the exterior trunk antenna 15, when executing a vehicle cabin exterior collation. The request signal includes a vehicle identification code for identifying the vehicle C. The vehicle identification code may indicate a device ID of the collation ECU 11 mounted in the vehicle C, or a vehicle ID of the vehicle C. The vehicle identification code may be stored in a non-volatile memory of the collation ECU 11 and read out for use. The vehicle-side transmission control unit 111 causes the LF transmitter 12 to transmit the request signal including the vehicle identification code from the interior antenna 14, when executing a vehicle cabin interior collation. The conditions for executing the vehicle cabin exterior collation and the vehicle cabin interior collation are predetermined.

The condition for executing the vehicle cabin exterior collation is, for example, that the power supply state of the vehicle C is the off state and all the doors are locked. When this condition is satisfied, the vehicle-side transmission control unit 111 causes the request signal to be transmitted periodically. The condition for executing the vehicle cabin interior collation is, for example, that the power switch 17 is pressed in a state where a brake pedal is pressed.

The vehicle-side reception control unit 112 receives signals transmitted in the UHF band radio wave from the electronic key 2, such as the response signal transmitted from the electronic key 2 in response to the request signal, via the UHF receiver 16. A signal indicating a key vibration, which is a vibration generated in the electronic key 2 (hereinafter referred to as the key vibration signal), is transmitted from the electronic key 2 and received by the UHF receiver 16. The key vibration signal is included in the response signal or is transmitted as a separate signal from the response signal. The key vibration signal, indicating the key vibration generated during some periods of time, is transmitted from the electronic key 2. One of the periods includes the time when the driver's door is closed after the driver is presumed to get in the vehicle C. The vehicle-side reception control unit 112 acquires the key vibration signal received by the UHF receiver 16. Therefore, the vehicle-side reception control unit 112 corresponds to a key vibration acquisition unit.

The registration unit 113 is an electrically rewritable non-volatile memory in which the electronic key identification code for identifying the electronic key 2 of a legitimate user is registered.

The collation unit 114 executes the code collation to confirm whether the electronic key 2 that is the source of the response signal received by the vehicle-side reception control unit 112 is the electronic key 2 of the legitimate user. The code collation is made between the electronic key identification code included in the response signal received from the electronic key 2 and the electronic key identification code registered in the registration unit 113.

The vehicle vibration acquisition unit 115 acquires a signal indicating the vehicle vibration (hereinafter referred to as the vehicle vibration signal) detected by the acceleration sensor 33 when the driver's door is closed after the driver is presumed to get in the vehicle C. In order to include the vehicle vibration at the time of the driver's door being closed in the vehicle vibration signal, the vehicle vibration acquisition unit 115 begins to acquire the vehicle vibration signal from a time when the driver's door of the vehicle C is opened. The vehicle vibration acquisition unit 115 keeps to acquire the vehicle vibration signal until a certain time elapses after the driver's door of the vehicle C is closed. The vehicle vibration acquisition unit 115 acquires the changes in the opening and closing of the driver's door from the body ECU 31.

The match determination unit 116 determines whether the vehicle vibration at the time of the driver's door being closed, indicated by the vehicle vibration signal acquired by the vehicle vibration acquisition unit 115, matches the key vibration at the time of the driver's door being closed, indicated by the key vibration signal received by the vehicle-side reception control unit 112.

The operation permission unit 117 determines whether or not to permit the operations of the operation target devices. The operation target devices include the door lock motor of the door locking mechanism and the engine. The condition for permitting the operation is set for each operation target device. As an example, a condition to permit the operation of the door lock motor to unlock the vehicle door can be a condition that the vehicle cabin exterior collation has been established. On the other hand, a condition to permit the engine to start includes, in addition to the fact that the vehicle cabin interior collation has been established, a condition that the match determination unit 116 has determined that the vehicle vibration and the key vibration at the time of the driver's door being closed match each other.

When permitting the operation of the operation target device, the operation permission unit 117 outputs a signal indicating an operation permission to a corresponding ECU that controls the operation target device. For example, if the door lock motor is permitted to operate, a signal is transmitted to the body ECU 31 to permit the door lock motor to operate in order to unlock the door locks. When the engine is permitted to start, a signal is transmitted to the engine ECU 32 to permit the engine to start.

The fraud determination unit 118 determines that the engine has been permitted to operate by an unauthorized method when the match determination unit 116 determines that the vehicle vibration and the key vibration do not match each other after the vehicle C has started traveling. Then, when it is determined that the engine has been permitted to operate by an unauthorized method, a predetermined control at the time of determination of the unauthorized method is executed. For example, the predetermined control includes a control to disable the engine operation. Specifically, the control to disable the engine operation prohibits fuel supply to the engine.

Configuration of Electronic Key 2

Figure 4:
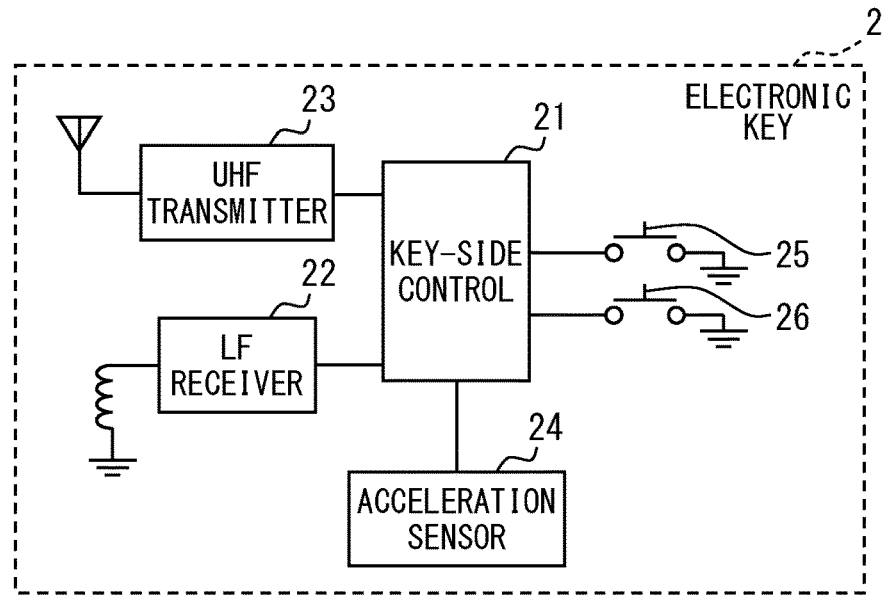
FIG. 4 is a block diagram showing a schematic configuration of an electronic key.

Next, the configuration of the electronic key 2 is described with reference to FIG. 4. As shown in FIG. 4, the electronic key 2 includes a key-side control unit 21, an LF receiver 22, a UHF transmitter 23, an acceleration sensor 24, and push switches 25 and 26.

The LF receiver 22 receives signals transmitted from the in-vehicle device 1 in the LF band radio wave. The UHF transmitter 23, which is a wireless transmitter, transmits a signal output from the key-side control unit 21 in the UHF band radio wave.

The acceleration sensor 24 detects an acceleration caused by a movement of the electronic key 2. The acceleration sensor 24 of the present embodiment detects accelerations occurring in three axis directions of x-axis, y-axis, and z-axis, separately. However, as an example different from the present embodiment, a single-axis acceleration sensor or a two-axis acceleration sensor can also be used.

The push switches 25 and 26 are switches for using the remote keyless entry function. When the push switch 25 is pressed, a signal to instruct the locking of the vehicle doors is transmitted from the UHF transmitter 23. On the other hand, when the push switch 26 is pressed, a signal to instruct the unlocking of the vehicle doors is transmitted from the UHF transmitter 23.

The key-side control unit 21 can be realized by a configuration with at least one processor. For example, the key-side control unit 21 can be realized by a computer including a CPU, a ROM, a RAM, an I/O, and bus lines that connect these components, and the like. The ROM stores a program for causing a general-purpose computer to function as the key-side control unit 21. As the CPU executes the program stored in the ROM while using the temporary storage function of the RAM, the key-side control unit 21 functions as each of the units shown in FIG. 5. The execution of these functions means that a method corresponding to the program is executed.

Functions Provided by Key-Side Control Unit 21

Figure 5:
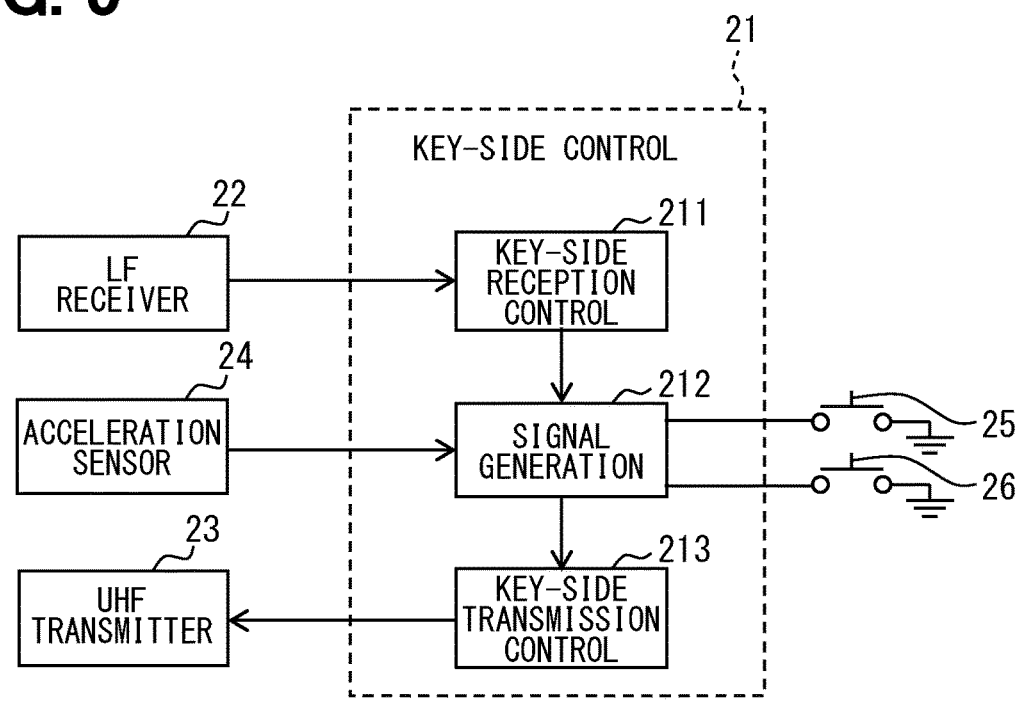
FIG. 5 is a block diagram showing functions provided in a key side control unit.

As shown in FIG. 5, the key-side control unit 21 includes a key-side reception control unit 211, a signal generation unit 212, and a key-side transmission control unit 213.

The key-side reception control unit 211 demodulates and decodes a signal received by the LF receiver 22 to retrieve the signal transmitted from the in-vehicle device 1. The retrieved signal is output to the signal generation unit 212. The signal transmitted from the in-vehicle device 1 includes the request signal, a detection start instruction signal, a detection end instruction signal, and a signal requesting transmission of the key vibration signal.

The signal generation unit 212 generates various signals to be transmitted from the UHF transmitter 23 to the in-vehicle device 1. For example, when receiving the request signal, the signal generation unit 212 generates the response signal in response to the request signal. When the push switch 25 is pressed, the signal generation unit 212 generates a signal that instructs the locking. When the push switch 26 is pressed, the signal generation unit 212 generates a signal that instructs the unlocking. Furthermore, when receiving the detection start instruction signal described below, the signal generation unit 212 activates the acceleration sensor 24 and acquires the key vibration signal from the acceleration sensor 24. The key vibration signal is continuously acquired until the detection end indication signal is acquired. The key vibration signal is included in the response signal. Also, when receiving the signal requesting the transmission of the key vibration signal, the signal generation unit 212 generates a transmission signal including the key vibration signal. In the present embodiment, the key vibration signal to be transmitted to the in-vehicle device 1 includes all the three axis components.

When the signal generation unit 212 generates the signal, the key-side transmission control unit 213 modulates and amplifies the signal and transmits it as a radio wave from the UHF transmitter 23.

Example of Flow of Process Executed by Collation ECU 11 Before Engine Start

Figure 6:
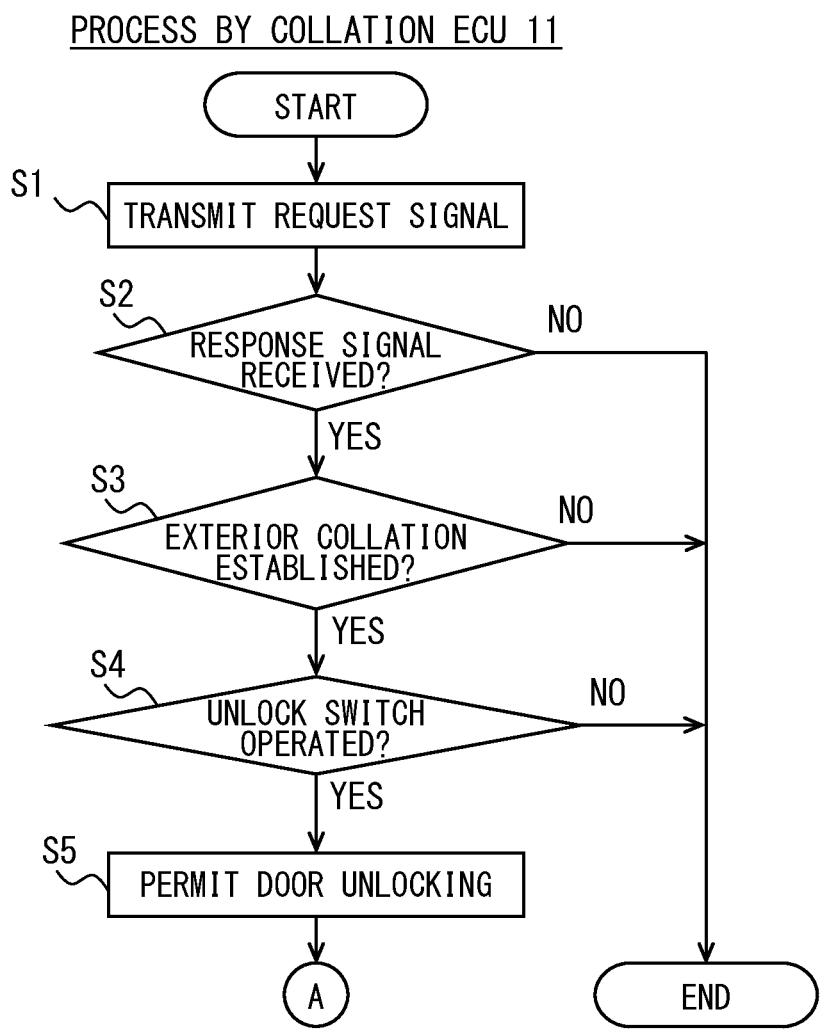
FIG. 6 is a flowchart showing a process executed by the collation ECU.

Next, an example of the flow of the processes executed by the collation ECU 11 is described with reference to a flowchart. FIG. 6 shows the process executed by the collation ECU 11 when the power supply of the vehicle C is in the off state and all the doors are locked.

In the process shown in FIG. 6, S1 is executed by the vehicle-side transmission control unit 111, S2 is executed by the vehicle-side reception control unit 112, S3 is executed by the collation unit 114, and S4 and S5 are executed by the operation permission unit 117.

In S1, the request signal is transmitted from the door antennas 13a-13d and the exterior trunk antenna 15 to the wireless communication areas around the vehicle C. When receiving the request signal, the electronic key 2 transmits back the response signal. Therefore, in S2, it is determined whether or not the response signal is received. When the determination result of S2 is NO, the process shown in FIG. 6 is ended. In this case, after a certain time elapses, S1 and subsequent steps are executed.

When the determination result of S2 is YES, the process proceeds to S3. In S3, the collation process is executed. As a result of the collation process, it is determined whether or not the vehicle cabin exterior collation is established. When the determination result of S3 is NO, the process shown in FIG. 6 is ended. On the other hand, when the determination result of S3 is YES, the process proceeds to S4.

In S4, it is determined whether or not an operation to the unlock sensor on an outer handle of the door is detected. When the determination result of S4 is NO, the process shown in FIG. 6 is ended. On the other hand, when the determination result of S4 is YES, the process proceeds to S5. In S5, a signal to permit unlocking of the door is output to the body ECU 31. Then, the process proceeds to S6 shown in FIG. 7.

Figure 7:
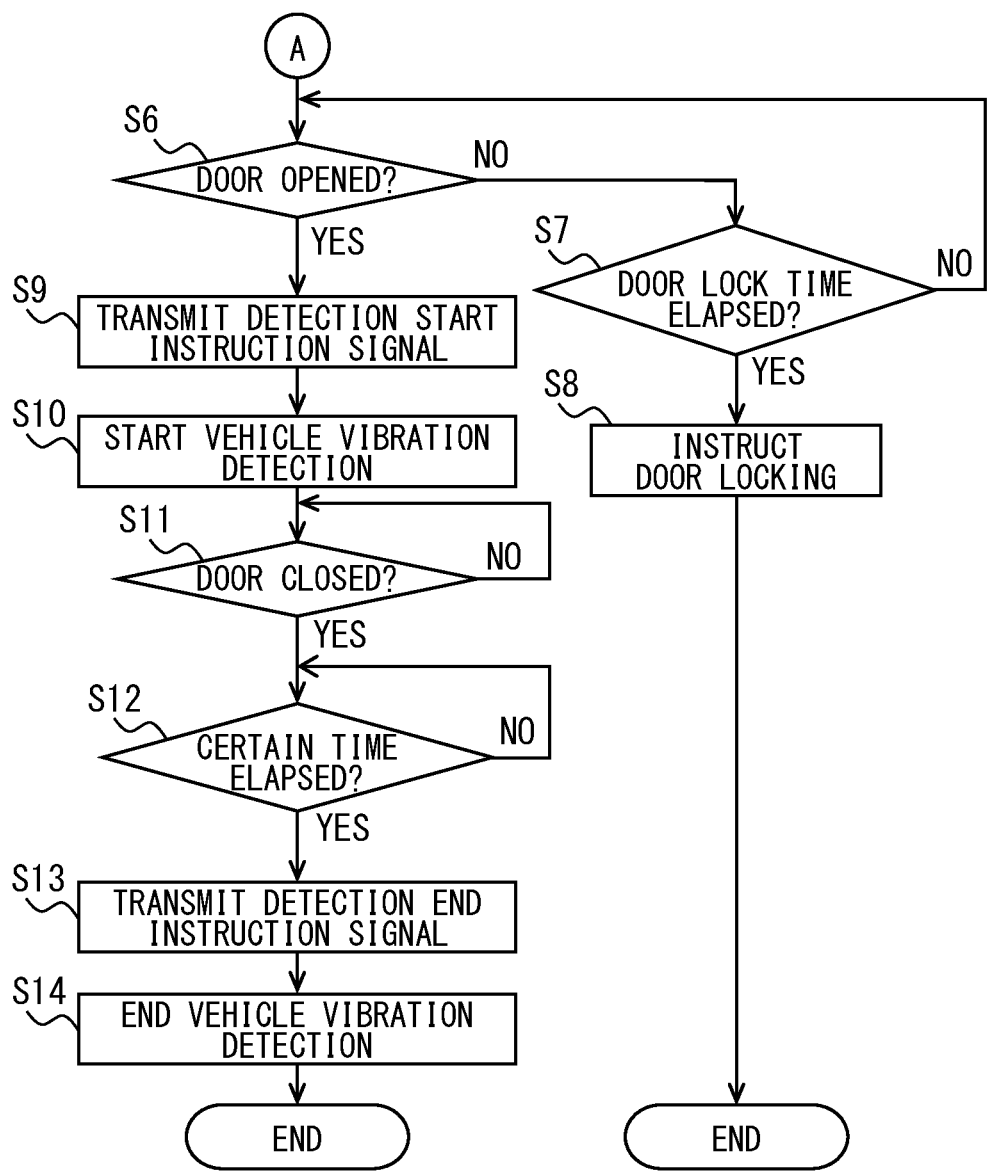
FIG. 7 is a flowchart showing the process executed by the collation ECU following the process in FIG. 6.

In the process shown in FIG. 7, S6, S10, S11, and S14 are executed by the vehicle vibration acquisition unit 115, S9, S12, and S13 are executed by the match determination unit 116, and S7 and S8 are executed by the operation permission unit 117.

In S6, the vehicle vibration acquisition unit 115 acquires from the body ECU 31 information indicating whether or not the driver's door is detected to be opened, and determines whether or not the driver's door is opened. When the determination result of S6 is NO, the process proceeds to S7. In S7, it is determined whether or not the elapsed time from unlocking the door exceeds a door lock time. When the determination result of S7 is NO, the process returns to S6. On the other hand, when the determination result of S7 is YES, the process proceeds to S8. In S8, a signal to instruct the body ECU 31 to lock the vehicle doors is transmitted to the body ECU 31. After that, the process shown in FIG. 7 is ended and the process returns to the process shown in FIG. 6.

When the determination result of S6 is YES, the process proceeds to S9. In S9, the LF transmitter 12 transmits a detection start instruction signal to the electronic key 2 to instruct to start the detection of the key vibration. The antenna that transmits the detection start instruction signal may be the door antenna 13a only, or both the door antenna 13a and the interior antenna 14. The other door antennas 13b, 13c, and 13d may also transmit the detection start instruction signal. The detection start instruction signal corresponds to the reference signal that indicates a start time of a period that is necessary to transmit the key vibration. In S10, the detection of the vehicle vibration is started.

In S11, the vehicle vibration acquisition unit 115 acquires from the body ECU 31 whether or not the driver's door is detected to be closed, and determines whether or not the driver's door is closed. When the determination result of S11 is NO, S11 is executed again. When the determination result of S11 is YES, the process proceeds to S12.

In S12, it is determined whether or not the certain time has passed since it was determined that the driver's door was closed. The certain time is set to be a little longer than a time required for the vibration caused by the closing of the driver's door to converge, which is determined based on experiments. When the determination result of S12 is NO, the determination of S12 is repeated. While the determination of S12 is repeatedly executed, the detection of vehicle vibration continues.

When the determination result of S12 is YES, the process proceeds to S13. In S13, the LF transmitter 12 transmits a detection end instruction signal to the electronic key 2 to instruct to end the detection of the key vibration detection. In S14, the detection of the vehicle vibration is ended. The vehicle vibration signals detected in the period from the execution of S10 to the execution of S14 are stored in the RAM or the like in the collation ECU 11. When S14 is executed, the process proceeds to FIG. 8.

Figure 8:
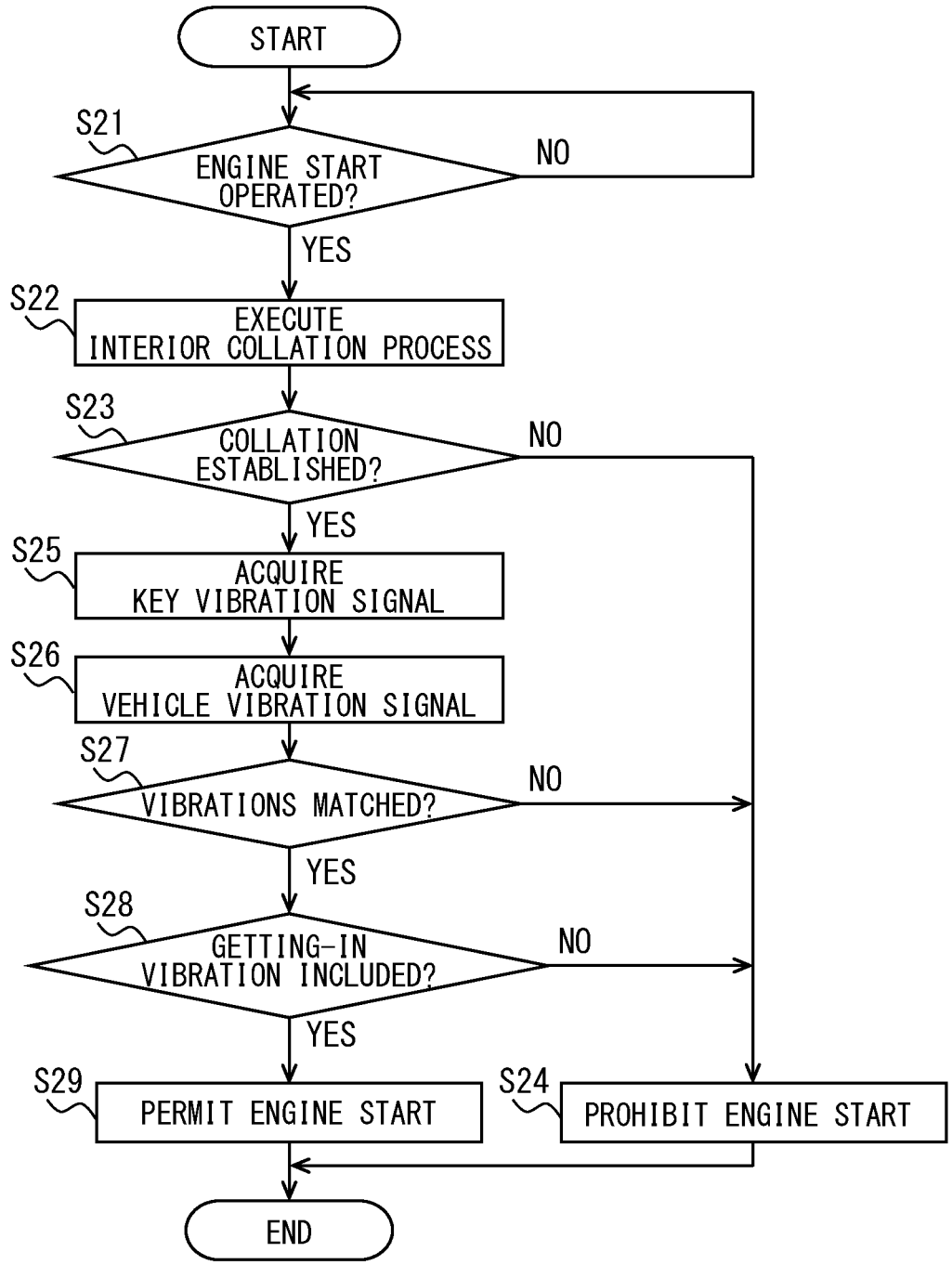
FIG. 8 is a flowchart showing the process executed by the collation ECU following the process in FIG. 7.

In the process shown in FIG. 8, S21 and S22 are executed by the collation unit 114, S23 and S25 to S27 are executed by the match determination unit 116, and S24, S28 and S29 are executed by the operation permission unit 117. The process proceeds to FIG. 8 in the case where the driver's door was opened and then closed. In this case, it can be presumed that the driver is in the vehicle C, that is, the driver is seated on the driver's seat. If the driver is seated on the driver's seat, there is a possibility that the driver may execute an operation to start the engine. Therefore, in S21, it is determined whether the engine start operation is executed or not. The engine start operation includes depressing the brake pedal and pressing the power switch 17.

When the determination result of S21 is NO, the determination of S21 is repeated. When the determination result of S21 is YES, the process proceeds to S22. In S22, the vehicle cabin interior collation process is executed. In the vehicle cabin interior collation process, the request signal is transmitted from the interior antenna 14. In the present embodiment, a signal requesting a transmission of the key vibration is included in the request signal or in a signal transmitted to the electronic key 2 after the request signal in the vehicle cabin interior collation process. By executing S9 and S13 in the process of FIG. 7, the detection start instruction signal and the detection end instruction signal are transmitted from the in-vehicle device 1 to the electronic key 2. Therefore, the electronic key 2 should have stored the key vibration at the time of executing S22. When receiving the signal requesting the transmission of the key vibration during the vehicle cabin interior collation process, the electronic key 2 transmits the key vibration signal to the in-vehicle device 1.

In S23, it is determined whether or not the vehicle cabin interior collation is established. If the determination result of S23 is NO, the process proceeds to S24. In S24, the engine start is not permitted. When the determination result of S23 is YES, the process proceeds to S25.

In S25, the match determination unit 116 acquires the key vibration signal acquired by the collation unit 114 in the vehicle cabin interior collation process. In S26, the vehicle vibration signal stored in the RAM or the like in the collation ECU 11 by executing the process of FIG. 7 is acquired.

In S27, the key vibration indicated by the key vibration signal acquired in S25 is compared with the vehicle vibration indicated by the vehicle vibration signal acquired in S26. Then, it is determined whether or not the key vibration and the vehicle vibration at the time of the driver's door being closed match each other. The key vibrations are acquired separately for the three axes. Of the vibrations in these three axes, the key vibration of the axis with the largest vibration when the driver's door is closed is compared to the vehicle vibration. The time when the driver's door is closed will be described later with reference to FIG. 9.

It is determined that the vehicle vibration and the key vibration caused when the driver's door is closed match each other on condition that the vibration periods coincide with each other and the waveforms (that is, shapes) coincide with each other between the vehicle vibration and the key vibration. Whether or not the shapes coincide with each other is determined, for example, by whether or not a correlation coefficient is equal to or higher than a threshold value. Alternatively, the vibration period alone may be used to determine that the vehicle vibration and the key vibration match each other. When the determination result of S27 is NO, the process proceeds to S24 described above, and prohibits the engine start. When the determination result of S27 is YES, the process proceeds to S28.

Figure 9:
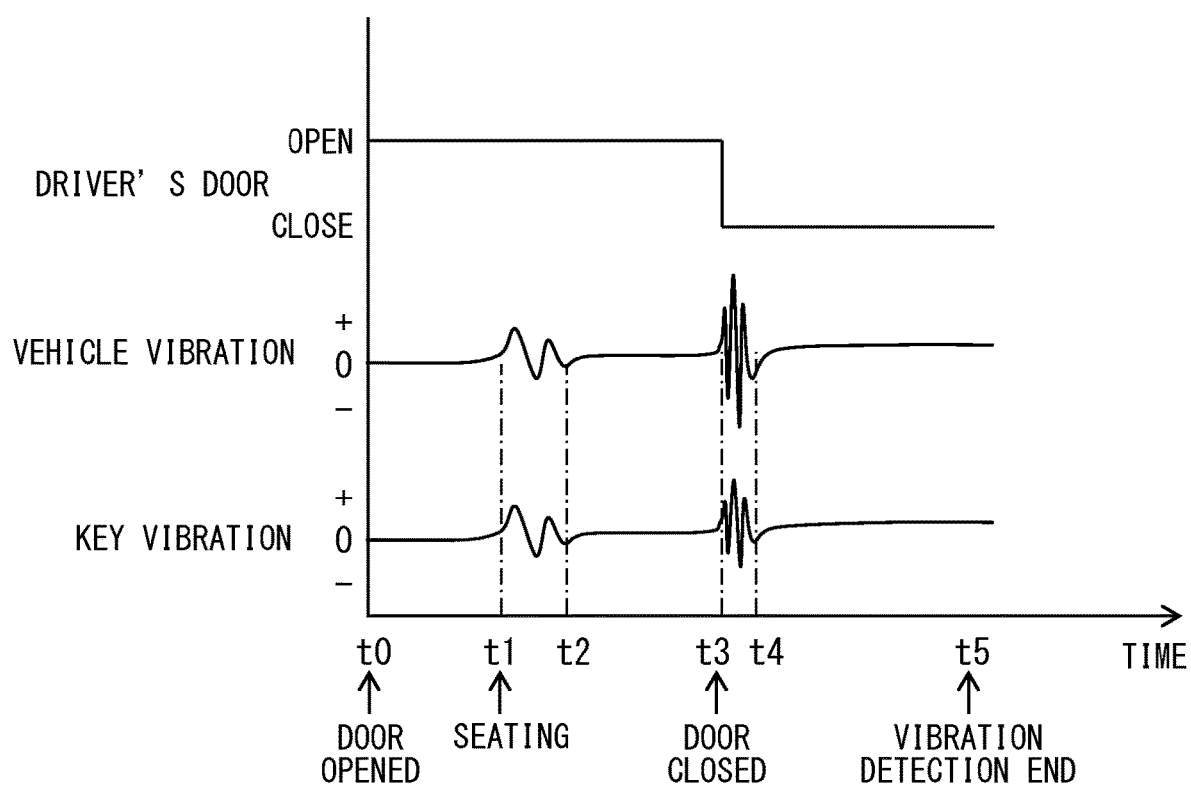
FIG. 9 is a diagram conceptually showing time variations of key vibration and vehicle vibration.

In S28, it is determined whether or not the key vibration includes the vibration caused when the driver gets into the vehicle. FIG. 9 shows conceptually the time variation of the key vibration indicated by the key vibration signal acquired in S25 and the vehicle vibration indicated by the vehicle vibration signal acquired in S26. FIG. 9 also shows an open/closed state of the driver's door.

In the present embodiment, the time of starting the signal acquisition is the time the driver's door is opened, and is defined as time t0. Time t1 is a time when the driver sits down on the driver's seat, causing changes in the vehicle vibration and the key vibration. These changes almost converge by time t2. At time t3, the open/closed state of the driver's door changes from the opened state to the closed state. In the vehicle vibration and the key vibration, vibrations caused by closing the driver's door are generated from the time t3. The vibrations caused by closing the driver's door almost converge by time t4. The period from the time t3 to the time t4 is a period in which the vehicle C is vibrating due to the driver's door being closed. Time t5 is a time at which the certain period of time has passed since it was determined that the driver's door was closed.

Among these times, the time t0 and the time t3 can be determined by acquiring the open/closed status of the driver's door from the body ECU 31. The time t4 can be defined as a time at which a vibration level returns to the level of the time t3. For example, when the moving average value of the rate of change of vibrations (that is, acceleration) is almost equal to the value before time t3, it is determined that the vibration level is returned to the level of the time t3.

The time t1, as the seating time the driver sits down on the driver's seat, is determined from the vehicle vibration. Specifically, the seating time can be defined at a start time of a period where the rate of change of vibrations is greater than an average value by a predetermined value between the time t0 and the time t3. When the rate of change of the key vibration is larger than that before at the time t1, it is determined that the key vibration includes the vibration due to the driver getting into the vehicle.

When the determination result of S28 is NO, the process proceeds to S24 as described above, and the engine start is not permitted. On the other hand, when the determination result of S28 is YES, the process proceeds to S29 and the engine start is permitted. When the engine start is permitted, the engine start permission signal is transmitted to the engine ECU 32.

As described above, in the present embodiment, the vehicle vibration and the key vibration are stored by executing the processes shown in FIG. 6 and FIG. 7. The operation of the engine is permitted on condition that the vehicle vibration and the key vibration match each other, in addition to that the vehicle cabin interior collation is established, Even if the electronic key 2 carried by a legitimate user is vibrating due to the legitimate user moving with the electronic key 2 carried when the driver's door of the vehicle C is closed, it is unlikely that the vibration of the electronic key 2 matches the vehicle vibration at the time of the driver's door being closed by an unauthorized person. Therefore, in the present embodiment, it is less likely that the operation of the operation target device will be permitted by an operation of the unauthorized person, as compared with the technique that only detects whether the electronic key 2 is vibrating when the vehicle door is closed.

Example of Flow of Process Executed by Collation ECU 11 After Engine Start

Figure 10:
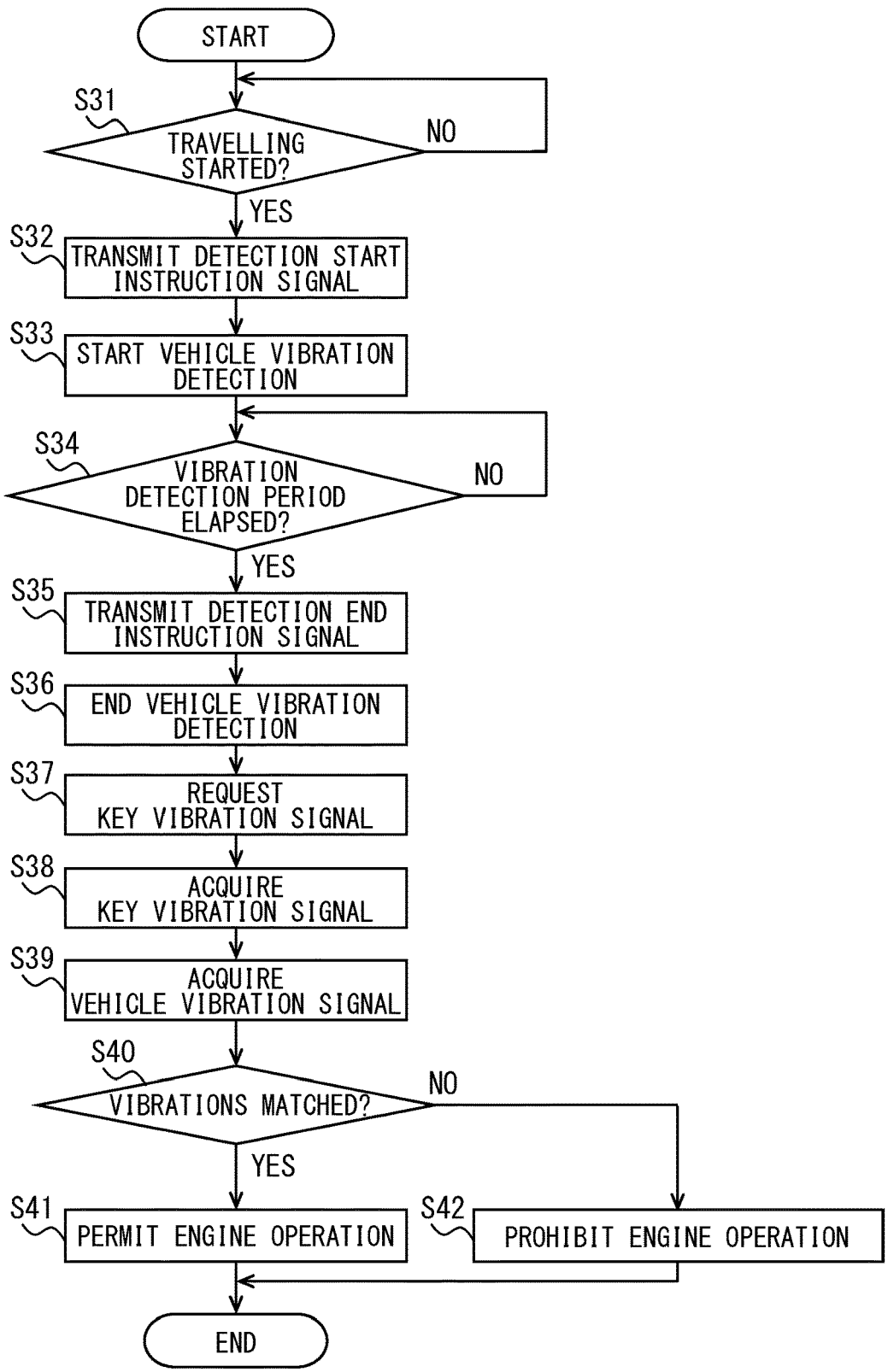
FIG. 10 is a flowchart showing a process executed by the collation ECU after an engine is started.

In the present embodiment, when S29 of the process in FIG. 8 is executed, the process shown in FIG. 10 is executed in order to further suppress the vehicle theft. Next, the process shown in FIG. 10 is described. In the process shown in FIG. 10, S33 and S36 are executed by the vehicle vibration acquisition unit 115, S32, S34, S35, S37 to S40 are executed by the match determination unit 116, and S31, S41 and S42 are executed by the fraud determination unit 118.

In S31, it is determined whether or not the vehicle C has started traveling. This determination is made, for example, by acquiring a vehicle speed signal via the in-vehicle LAN 30. When the determination result of S31 is NO, the determination of S31 is repeated. When the determination result of S31 is YES, the process proceeds to S32.

In S32, the LF transmitter 12 is controlled to transmit the detection start instruction signal from the interior antenna 14. In S33, the detection of vehicle vibration is started.

In S34, it is determined whether or not the elapsed time since the execution of S33 exceeds a vibration detection period. The vibration detection period is a data collection period necessary to accurately determine the matching between the vehicle vibration and the key vibration, and can be set arbitrarily. For example, the vibration detection period can be about 10 seconds. When the determination result of S34 is NO, S34 is repeated. When the determination result of S34 is YES, the process proceeds to S35.

In S35, the LF transmitter 12 is controlled to transmit the detection end instruction signal from the interior antenna 14. In S36, the detection of vehicle vibration is ended. The vehicle vibration signals detected in the period from the execution of S33 to the execution of S36 are stored in the RAM or the like in the collation ECU 11.

In S37, the LF transmitter 12 is controlled to transmit the signal requesting the key vibration signal from the interior antenna 14. In S38, the key vibration signal transmitted from the electronic key 2 in response to the signal transmitted in S37 and received by the UHF receiver 16 is acquired from the UHF receiver 16.

In S39, the vehicle vibration signal stored in the RAM or the like in the collation ECU 11 is acquired. In S40, it is determined whether or not the key vibration indicated by the key vibration signal acquired in S38 matches the vehicle vibration indicated by the vehicle vibration signal acquired in S39. In this case, since the vibration detection period is the same, the matching is determined based on whether or not the shapes match each other. Whether or not the shapes match each other is determined, for example, by whether or not the correlation coefficient is equal to or higher than a threshold value. Although the key vibration signal is requested, if the key vibration signal cannot be acquired, the determination result of S40 is also NO.

When the determination result of S40 is YES, the process proceeds to S41 and the engine is permitted to continue operating. On the other hand, if the determination result of S40 is NO, the process proceeds to S42 and prohibits the engine operation. In order to prohibit the engine operation, a fuel supply to the engine is disabled.

Summary of Embodiment

In the vehicle electronic key system EKS described hereinabove, the engine operation is permitted on condition that the vehicle vibration and the key vibration at the time of the driver's door being closed are determined to match each other (S27, S29). When the driver's door is closed by an unauthorized person, even if the electronic key 2 carried by a legitimate user is vibrating due to the legitimate user is moving with the electronic key 2, the key vibration and the vehicle vibration less likely to match each other. Therefore, in the vehicle electronic key system EKS of the present embodiment, it is less likely that the engine start will be permitted by the operation of the unauthorized person.

In the present embodiment, in order to determine that the vehicle vibration and the key vibration match each other in S27, the vibration periods and the vibration waveforms need to match each other between the vehicle vibration and the key vibration. Therefore, in a case where the radio wave is relayed by the unauthorized person it can be further suppressed that the key vibration of the legitimate electronic key 2 outside the vehicle and the vehicle vibration at the time of the driver's door being closed coincidentally match each other, as compared to the case where only the matching of either the vibration period or the vibration waveform is determined.

In the present embodiment, the collation ECU 11 transmits the detection start instruction signal, when determining that the driver's door is opened (S9). Therefore, as described hereinabove with reference to FIG. 9, it is possible to easily determine the time point at which the driver's door is closed in the key vibration indicated by the key vibration signal acquired. As such, the vehicle vibration can be easily compared with the key vibration at the time the driver's door is closed.

In the present embodiment, the conditions to permit the engine start include not only the condition that the vehicle vibration and the key vibration at the time of the driver's door being closed match each other, but also the condition that the key vibration includes the vibration caused at the time of the driver getting in the vehicle (S28). As such, it is possible to further suppress the engine start from being permitted by the operation of the unauthorized person.

In the present embodiment, the period that probably includes the vibrations caused by the driver getting on the vehicle in the key vibration is determined from the vehicle vibration. In the state where the electronic key 2 is carried by the user, the electronic key 2 is frequently vibrated. Therefore, it may be difficult to determine which time period includes the vibration at the time of the driver getting in the vehicle. In contrast, in many cases, vibrations occurring in the period from the time the driver's door is opened to the time the driver's door is closed are likely to be caused only by the driver getting in the vehicle. Therefore, according to the present embodiment, it can be accurately determined whether or not the key vibration includes the vibration caused by the driver getting in the vehicle C.

In the present embodiment, even after the vehicle C has started traveling, it is determined whether the vehicle vibration and the key vibration match each other. When it is determined that the vehicle vibration and the key vibration do not match each other, the engine operation is not permitted (S42). Therefore, it is possible to suppress the vehicle C from being stolen, even if the engine start is permitted once and the travelling of the vehicle C is started by the unauthorized person In the present embodiment, the electronic key 2 includes an acceleration sensor 24 that separately detects the accelerations occurring in the three axis directions, and is capable of detecting key vibration in each of the three axis directions. Among the key vibrations in the three axis directions, the key vibration in the axis direction in which the magnitude of vibration is the largest at the time of the driver's door being closed is compared to the vehicle vibration (S27). The key vibration in the axis direction in which the magnitude of vibration at the time the driver's door being closed is the largest is most likely to represent the vibration caused by the driver's door being closed, among the key vibrations in the three axis directions. For this reason, the accuracy of the determination in S27 is improved.

Although the embodiment has been described above, the disclosed technology is not limited to the above-described embodiment, and the following modifications are included in the scope of the disclosure, and various modifications can be made without departing from the gist of the present disclosure. In the following descriptions, elements having the same reference numerals as those used so far are the same elements in the precedently described embodiments or modifications, unless being specifically mentioned. In the case where only a part of a configuration is described, the other part of the configuration can be provided by those described in the precedently described embodiments or modifications <Modification 1>

In the embodiment described above, the engine operation is prohibited as the disposal when the determination result of S40 is NO. However, the disposal to be taken when the determination result of S40 is NO is not limited to such an example. Instead of or in addition to prohibiting the engine operation, a signal indicating that the vehicle has been stolen may be transmitted from a wide-area wireless communication unit in the vehicle C, or an alarm may be output from one or both of a display unit and a speaker in the vehicle.

<Modification 2>

In the embodiment described above, the condition of the engine start includes the condition that the key vibration includes the vibration caused by the driver riding on the vehicle. Alternatively, the condition of the engine start may not include the condition that the key vibration includes the vibration caused by the driver riding on the vehicle.

<Modification 3>

In the embodiment described above, when the driver's door is determined to be opened, the detection start instruction signal, which is the reference signal, is transmitted (S9). However, the time when the driver's door is opened can also be determined based on the time when the door is unlocked, and that the detection start indication signal may be transmitted when the door is unlocked.

In the case where the detection of the key vibration is begun from the time when the electronic key 2 starts the vehicle cabin exterior collation, or in the case where the key vibration is detected at all time, the following can be executed. That is, when the driver's door is determined to be opened, or when the door is unlocked, the reference signal may be transmitted, in place of the detection start instruction signal, as a signal indicating the start time of the period requiring transmission of the key vibration. The electronic key 2 transmits the key vibration signal to the in-vehicle device 1 so that the time of reception of the reference signal can be identified in the key vibration over time indicated by the key vibration signal.

<Modification 4>

It is not always necessary to transmit the reference signal from the in-vehicle device 1 to the electronic key 2. In a case where the in-vehicle device 1 does not transmit the reference signal to the electronic key 2, the electronic key 2 may, for example, transmit the key vibration signal from the time of the vehicle cabin exterior collation to the time the key vibration signal is requested. The match determination unit 116 may determine the period of vibration at the time of the driver's door being closed based on the shape of the waveform separately for the vehicle vibration and the key vibration.

<Modification 5>

The operation target device whose operation is permitted on condition that the vehicle vibration and the key vibration at the time of the driver's door being closed is not limited to the engine. The operation target device may include a motor that drives the vehicle C, and various other devices in the vehicle cabin, such as a meter, navigation system, and air conditioning system.

<Modification 6>

The electronic key 2 of the embodiment described above is a dedicated device for the vehicle electronic key system EKS. However, various mobile terminals with applications other than those for the vehicle electronic key system EKS, such as smartphones, can be used as the electronic key 2 for the vehicle electronic key system EKS as long as having wireless communication functions When the mobile terminal provided with other applications, such as a smart phone, is used as an electronic key 2, a wireless communication method that the mobile terminal has for other applications, such as wireless LAN, Bluetooth (registered trademark), Bluetooth Low Energy, etc., can be used for communication with the in-vehicle device 1.

<Modification 7>

The collation ECU 11 and the key-side control unit 21, which function as controllers of the present disclosure, and the methods executed by the collation ECU 11 and the key-side control unit 21 may be realized by one or more dedicated computers each comprising a processor programmed to execute one or more functions embodied by a computer program. Alternatively, the control units and the methods described in the present disclosure may be implemented by one or more dedicated hardware logic circuits. Alternatively, the controllers and the methods described in the present disclosure may be implemented by one or more dedicated computers each configured by a combination of a processor executing a computer program and one or more hardware logic circuits. Hardware logic circuits are, for example, ASICs and FPGAs.

The storage medium for the computer program is not limited to ROM, but can be stored in a computer-readable, non-transitory tangible storage medium as instructions to be executed by a computer. For example, the above program may be stored in the flash memory.

What is claimed is:

1. A vehicle electronic key system including an electronic key and an in-vehicle device mounted in a vehicle, the electronic key and the in-vehicle device communicating wirelessly with each other, the vehicle electronic key system comprising:
a vehicle vibration acquisition unit that acquires a vehicle vibration, which is a vibration generated in the vehicle, at a time of a driver's door of the vehicle being closed after a driver is presumed to get in the vehicle;
a key vibration acquisition unit that acquires a key vibration, which is a vibration generated in the electronic key, at a time of the driver's door being closed after the driver is presumed to get in the vehicle;
a match determination unit that determines whether or not the vehicle vibration and the key vibration at the time of the driver's door being closed match each other; and
an operation permission unit that permits an operation of a predetermined operation target device mounted in the vehicle, in response to the match determination unit determining that the vehicle vibration and the key vibration at the time of the driver's door being closed match each other.

2. A vehicle electronic key system according to claim 1, wherein
the in-vehicle device includes:
the key vibration acquisition unit; and
a vehicle-side transmission control unit that causes a wireless transmitter mounted in a vehicle to transmit to the electronic key a reference signal indicating a start time of a period that is necessary to transmit the key vibration, in response to a door lock of the vehicle being unlocked or the driver's door being determined to be opened,
the electronic key includes a key-side transmission control unit that causes a wireless transmitter of the electronic key to transmit to the in-vehicle device the key vibration detected in the period determined based on the reference signal, and
the key vibration acquisition unit acquires the key vibration transmitted from the electronic key.

3. A vehicle electronic key system according to claim 1, wherein
the match determination unit determines, based on the vehicle vibration, a vehicle vibrating period in which the vehicle is vibrating due to the driver's door being closed, determines, based on the key vibration, a key vibrating period in which the electronic key is vibrating due to the driver's door being closed, and determines whether or not the vehicle vibrating period matches the key vibrating period match each other.

4. A vehicle electronic key system according to claim 1, wherein
the match determination unit determines whether or not a waveform of the vehicle vibration caused by the driver's door being closed matches a waveform of the key vibration caused by the driver's door being closed.

5. A vehicle electronic key system according to claim 1, wherein
the key vibration acquisition unit acquires the key vibration for a period of time that includes a period from a time the driver's door is opened to a time the driver's door is closed,
the operation permission unit permits the operation of the predetermined operation target device in response to the match determination unit determining that the vehicle vibration and the key vibration at the time of the driver's door being closed match each other as well as the key vibration including a vibration caused by the driver getting in the vehicle.

6. A vehicle electronic key system according to claim 5, wherein
the vehicle vibration acquisition unit acquires the vehicle vibration for a period of time that includes a period from a time the driver's door is opened to a time the driver's door is closed,
the operation permission unit determines a time when the driver gets in the vehicle based on the vehicle vibration in the period from the time the driver's door is opened to the time the driver's door is closed, and
the operation permission unit determines, based on the key vibration, whether or not the key vibration includes the vibration caused by the driver getting in the vehicle.

7. A vehicle electronic key system according to claim 1, wherein
when the vehicle starts running after the operation permission unit permits the operation of the predetermined operation target device, the vehicle vibration acquisition unit and the key vibration acquisition unit acquire the vehicle vibration and the key vibration again, and
the match determination unit determines whether or not the vehicle vibration and the key vibration acquired by the vehicle vibration acquisition unit and the key vibration acquisition unit again match each other,
the vehicle electronic key system further comprising:
a fraud determination unit that determines that the operation of the predetermined operation target device has been permitted by an unauthorized method in response to the match determination unit determining that the vehicle vibration and the key vibration do not match each other.

8. A vehicle electronic key system according to claim 1, wherein
the electronic key includes a three axis acceleration sensor,
the key vibration acquisition unit acquires, among vibrations in three axis direction detected by the acceleration sensor, at least a maximum vibration at the time of the driver's door being closed,
the match determination unit compares the maximum vibration with the vehicle vibration at the time of the driver's door being closed to determine whether or not the vehicle vibration and the key vibration match each other.

9. An in-vehicle device mounted in a vehicle that communicates wirelessly with an electronic key, the in-vehicle device comprising:
a vehicle vibration acquisition unit that acquires a vehicle vibration, which is a vibration generated in the vehicle, at a time of a driver's door being closed after a driver gets in the vehicle,
a key vibration acquisition unit that acquires a key vibration, which is a vibration generated in the electronic key, at a time the driver's door being closed after the driver is presumed to get in the vehicle,
a match determination unit that determines whether or not the vehicle vibration and the key vibration at the time of the driver's door being closed match each other, and
an operation permission unit that permits an operation of a predetermined operation target device mounted in the vehicle in response to the match determination unit determining that the vehicle vibration and the key vibration at the time of the driver's door being closed match each other.

10. A vehicle electronic key system including an electronic key and an in-vehicle device mounted in a vehicle, the electronic key and the in-vehicle device communicating wirelessly with each other, the vehicle electronic key system comprising:
one or more controllers configured to:
(i) acquire a vehicle vibration, which is a vibration generated in the vehicle, at a time of a driver's door of the vehicle being closed after a driver is presumed to get in the vehicle;
(ii) acquire a key vibration, which is a vibration generated in the electronic key, at a time of the driver's door being closed after the driver is presumed to get in the vehicle;
(iii) determine whether or not the vehicle vibration and the key vibration at the time of the driver's door being closed match each other; and
(iv) permit an operation of a predetermined operation target device mounted in the vehicle, in response to the vehicle vibration and the key vibration at the time of the driver's door being closed matching each other.

* * * * *